(12) United States Patent
Skärby et al.

(10) Patent No.: US 11,848,786 B2
(45) Date of Patent: Dec. 19, 2023

(54) METHOD AND STATUS MANAGER FOR CONTROLLING STATUS REPORTING IN WIRELESS COMMUNICATION DATA

(71) Applicant: Telefonaktiebolaget LM Ericsson (publ), Stockholm (SE)

(72) Inventors: Christian Skärby, Stockholm (SE); David Better, Täby (SE); Johnny Karlsen, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 21 days.

(21) Appl. No.: 17/608,199

(22) PCT Filed: May 2, 2019

(86) PCT No.: PCT/SE2019/050390
§ 371 (c)(1),
(2) Date: Nov. 2, 2021

(87) PCT Pub. No.: WO2020/222684
PCT Pub. Date: Nov. 5, 2020

(65) Prior Publication Data
US 2022/0216953 A1    Jul. 7, 2022

(51) Int. Cl.
*H04L 1/1829* (2023.01)
*H04L 1/1607* (2023.01)

(52) U.S. Cl.
CPC .......... *H04L 1/1848* (2013.01); *H04L 1/1664* (2013.01); *H04L 1/1685* (2013.01); *H04L 1/1854* (2013.01)

(58) Field of Classification Search
None
See application file for complete search history.

(56) References Cited

U.S. PATENT DOCUMENTS

| 6,697,983 B1 | 2/2004 | Chintada et al. |
| 10,638,347 B2 * | 4/2020 | Tian ...................... H04L 1/1854 |

(Continued)

FOREIGN PATENT DOCUMENTS

| CN | 102883373 A | 1/2013 |
| CN | 103327536 A | 9/2013 |

OTHER PUBLICATIONS

International Search Report and Written Opinion of the International Searching Authority, PCT/SE2019/050390, dated Jan. 29, 2020, 9 pages.

(Continued)

*Primary Examiner* — Lonnie V Sweet
(74) *Attorney, Agent, or Firm* — SAGE PATENT GROUP

(57) ABSTRACT

A method and a status manager for controlling status reporting from a data receiving node in a wireless communication of data with a data sending node. When detecting that the data receiving node should transmit a status report to the data sending node before a prescribed time limit expires, the data receiving node is triggered to transmit the status report either together with data if the data is pending for transmission from the data receiving node when the time left before the prescribed time limit is greater than a minimum duration, or alone if no data is pending when the time left before the time limit becomes shorter than the minimum duration.

20 Claims, 5 Drawing Sheets

(56) References Cited

U.S. PATENT DOCUMENTS

| | | | |
|---|---|---|---|
| 2004/0123210 A1* | 6/2004 | Baudry | H04L 1/1685 |
| | | | 714/748 |
| 2006/0136598 A1* | 6/2006 | Fischofer | H04L 1/1664 |
| | | | 709/239 |
| 2007/0091894 A1* | 4/2007 | Kang | H04L 1/1854 |
| | | | 370/349 |
| 2011/0051661 A1* | 3/2011 | Venkob | H04L 1/1848 |
| | | | 370/328 |
| 2011/0125915 A1* | 5/2011 | Takei | H04L 69/163 |
| | | | 709/230 |
| 2019/0053226 A1 | 2/2019 | Xiong et al. | |
| 2020/0235865 A1* | 7/2020 | Takeda | H04L 1/1854 |

OTHER PUBLICATIONS

3GPP, $3^{rd}$ Generation Partnership Project; Technical Specification Group Radio Access Network; Evolved Universal Terrestrial Radio Access (E-UTRA); Radio Link Control (RLC) protocol specification (Release 15); 3GPP TS 36.322 v15.1.0 (Jul. 2018), 45 pages.

Examination Report dated Apr. 13, 2022 for Indian Patent Application No. 202147054726, 5 pages.

Office Action dated Oct. 14, 2023 for Chinese Patent Application No. 201980095989.X, 8 pages.

\* cited by examiner

METHOD AND STATUS MANAGER FOR CONTROLLING STATUS REPORTING IN WIRELESS COMMUNICATION DATA

CROSS REFERENCE TO RELATED APPLICATIONS

This application is a 35 U.S.C. § 371 national stage application of PCT International Application No. PCT/SE2019/050390 filed on May 2, 2019, the disclosure and content of which is incorporated by reference herein in its entirety.

TECHNICAL FIELD

The present disclosure relates generally to a method and a status manager for controlling status reporting in wireless communication of data between a data sending node and a data receiving node.

BACKGROUND

In wireless communication of data between a network node and a wireless device, it is often required that data transmitted by either of these nodes is acknowledged by the other opposite node when having received and correctly decoded the data that was transmitted. Such an acknowledgement of received data is typically made by sending a status report to the node that has transmitted the data. When such status reporting is applied, it is commonly said that the nodes are in so-called "Acknowledgement Mode", AM.

In the following description, the node that transmits data to be acknowledged is denoted a "data transmitting node" and the node that receives and acknowledges the data is denoted a "data receiving node". The description is valid for both downlink and uplink transmission of data, and it follows that the data transmitting node could be either a network node or a wireless device, while the data receiving node would then conversely be the opposite wireless device or network node, respectively. It is also possible that both the data transmitting and receiving nodes are wireless devices such as in the case of a Device-to Device, D2D, communication.

FIG. 1 illustrates a wireless communication of data between a wireless device 100 and a network node 102, the latter belonging to a wireless network 104 which could also be referred to as a mobile network or radio access network, depending on the terminology used. It may thus be required that data transmitted by the network node 102 on the downlink should be acknowledged by the wireless device 100, while it may additionally or alternatively be required that data transmitted by the wireless device 100 on the uplink should be acknowledged by the network node 102.

If some data, e.g. transmitted in the form of a Protocol Data Unit, PDU, has not been acknowledged by the data receiving node in a status report, e.g. a so-called status PDU, it may be necessary for the data transmitting node to retransmit the unacknowledged data once again which consumes additional radio resources. An acknowledgement of correctly received and decoded data will be referred to herein as a status report, and one such status report may identify any number of acknowledged data units or PDUs, which may be identified by a sequence number or similar, which is well known in the field of wireless communication.

FIGS. 2A and 2B illustrate how a wireless device 100 and a network node 102 may typically operate when they are in the above-mentioned Acknowledgement Mode, AM, in communication of uplink (UL) data and downlink (DL) data, respectively. The wireless device 100 comprises an uplink transmitter part 100A and a downlink receiver part 100B, while the network node 102 conversely comprises a downlink transmitter part 102A and an uplink receiver part 102B. According to the above definitions, the wireless device 100 is the data transmitting node and the network node 102 is the data receiving node in FIG. 2A, while the network node 102 is the data transmitting node and the wireless device 100 is the data receiving node in FIG. 2B.

In FIG. 2A, the wireless device 100 transmits data from the uplink transmitter part 100A, which data should hopefully be received by the uplink receiver part 102B in the network node 102, if the current radio conditions are favorable enough. The data in this example may be comprised of one or more PDUs which require acknowledgement in a status report from the network node 102 within a prescribed time limit, if the data has been received and successfully decoded by the network node 102. Such a time limit or "deadline" is typically prescribed for various reasons such as to enable retransmission, if needed through lack of acknowledgement, before the data becomes useless or out-of-date or similar. If no such status report has been received when the prescribed time limit expires, the wireless device 100 will assume that the transmitted data has not been correctly received and decoded by the network node 102 and therefore needs to retransmit the same data by the uplink transmitter part 100A.

In FIG. 2B, the network node 102 transmits data from its downlink transmitter part 102A, which data is hopefully received by the downlink receiver part 100B in the wireless device 100, if the current radio conditions allow. The data likewise requires acknowledgement in a status report from the wireless device 100 within a prescribed time limit or deadline, if the data has been received and successfully decoded by the wireless device 100. If no such status report is received before the prescribed time limit expires, the network node 102 will likewise assume that the transmitted data has not been correctly received and decoded by the wireless device 100 and therefore may need to retransmit the same data, or other information, by the downlink transmitter part 102A. It should be noted that a wireless communication between a wireless device 100 and a network node 102 may involve communication of data in just one direction i.e. either uplink or downlink, or in both directions i.e. both uplink and downlink.

The transmitter and receiving parts in wireless devices and network nodes are sometimes referred to as Acknowledgement Mode Radio Link Control entities, so-called AM RLC entities. With further reference to FIGS. 2A and 2B, FIG. 2C illustrates how an AM RLC entity 1 is comprised of the uplink transmitter part 100A and the downlink receiver part 100B in the wireless device 100, while an AM RLC entity 2 is comprised of the downlink transmitter part 102A and the uplink receiver part 102B in the network node 102.

The transmission of a status report that acknowledges a number of received PDUs or similar is associated with a cost for the network in terms of consumed radio resources which are typically available in limited supply. It is therefore desirable to keep the number of status reports low, but at the same time the status reporting must be made often enough to enable retransmission of non-acknowledged data in time, i.e. before the data becomes useless or out-of-date at the receiving side, as explained above. Therefore, the frequency of status reports should be carefully selected as a tradeoff between keeping the resource consumption low and ensuring that the status reports, such as status PDUs, get across in time.

It should be noted that transmission of a status report, or status PDU, has a minimum cost even if there are very few or even just one PDU to acknowledge since a certain amount of signaling is needed to set up the transmission including to allocate the necessary radio resources for the report. It is thus a problem in wireless communication of data in Acknowledgement mode, AM, to both ensure safe communication of data and consume as little radio resources as possible.

SUMMARY

It is an object of embodiments described herein to address at least some of the problems and issues discussed in this disclosure. It is possible to achieve this object and others by using a method and a status manager as defined in the attached independent claims.

According to one aspect, a method is performed by a status manager in a wireless communication of data between a data sending node and a data receiving node, for controlling status reporting from the data receiving node regarding reception of the data.

In this method, the status manager detects that the data receiving node has been triggered to transmit a status report that indicates received data to the data sending node before a prescribed time limit expires. When this is detected the status manager either triggers the data receiving node to transmit the status report together with data to the data sending node if said data is pending for transmission from the data receiving node when the time left before said prescribed time limit is greater than a minimum duration. Otherwise, the status manager triggers transmission of the status report alone, that is if no data is pending for transmission from the data receiving node when the time left before said prescribed time limit becomes shorter than the minimum duration.

According to another aspect, a status manager is arranged to control status reporting from a data receiving node regarding reception of data in a wireless communication of data between a data sending node and the data receiving node. The status manager is configured to detect that the data receiving node has been triggered to transmit a status report that indicates received data to the data sending node before a prescribed time limit expires.

The status manager is also configured to trigger the data receiving node to transmit the status report together with data to the data sending node if said data is pending for transmission from the data receiving node when the time left before said prescribed time limit is greater than a minimum duration. The status manager is further configured to trigger transmission of the status report alone if no data is pending for transmission from the data receiving node when the time left before said prescribed time limit becomes shorter than the minimum duration.

In effect, pending data occurring prior to the time left before the time limit reaches the minimum duration works as a first trigger for transmitting the status report with the data, while no pending data occurring before the time left becomes shorter than the minimum duration works as a second trigger for transmitting the status report alone. This behavior has the advantages of saving radio resources whenever possible by piggy-backing the report on the pending data when the first trigger is released, while at the same time ensuring that the report is transmitted in time before the prescribed time limit by releasing the second trigger in case no pending data occurs to release the first trigger.

The above method and a status manager may be configured and implemented according to different optional embodiments to accomplish further features and benefits, to be described below.

A computer program is also provided comprising instructions which, when executed on at least one processor in the status manager, cause the at least one processor to carry out the method described above. A carrier is also provided which contains the above computer program, wherein the carrier could be one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Figure 1:
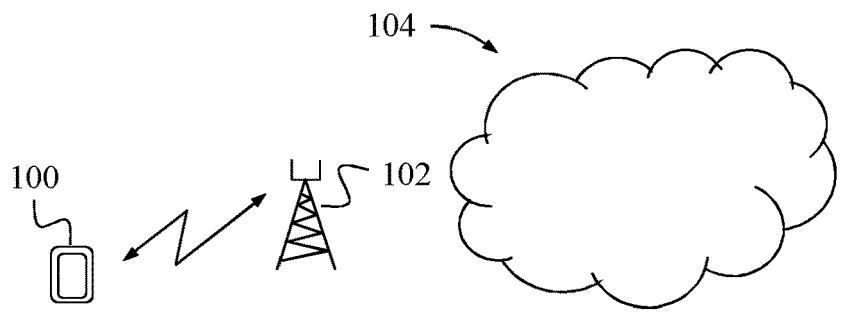
FIG. 1 is a communication scenario generally illustrating a wireless communication between a network node and a wireless device.
Figure 2A:
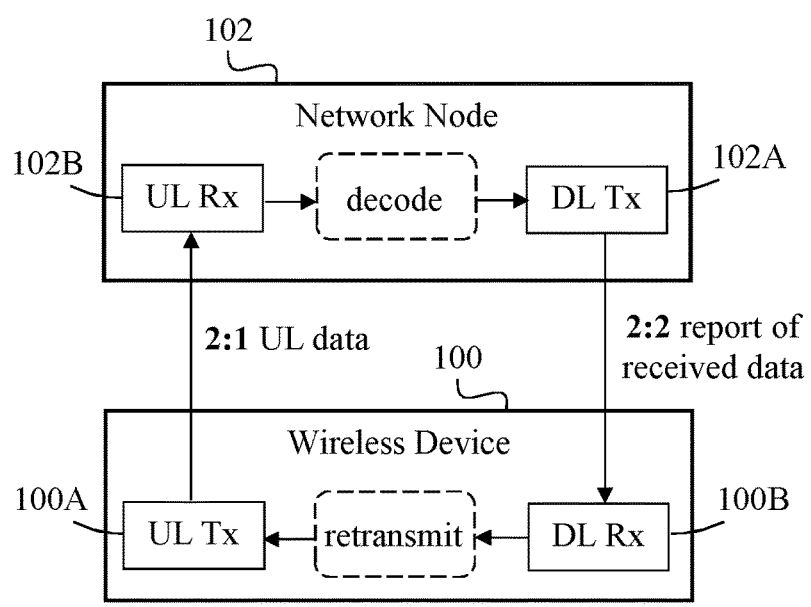
FIGS. 2A and 2B is a communication scenario illustrating how a wireless device and a network node can employ status reporting of uplink data and downlink data, respectively, when in Acknowledgement Mode, AM.
Figure 2B:
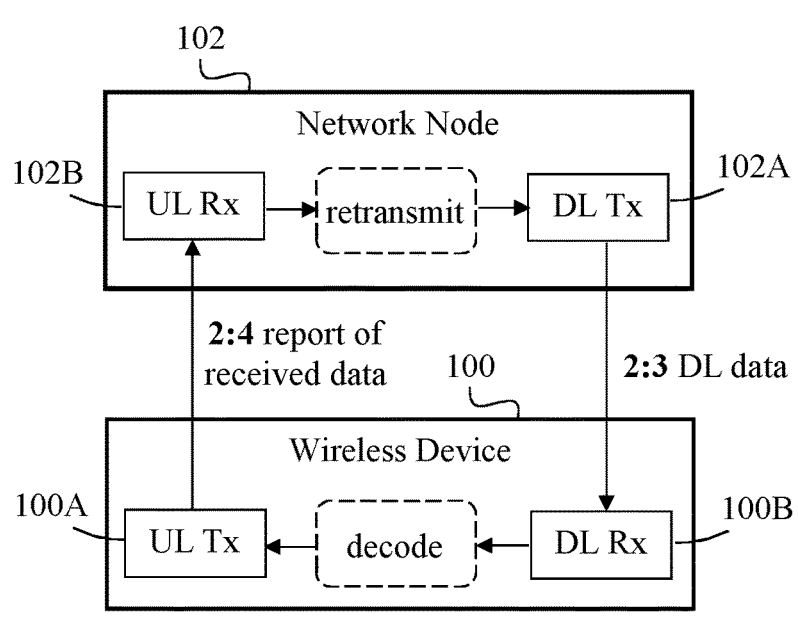
Figure 2C:
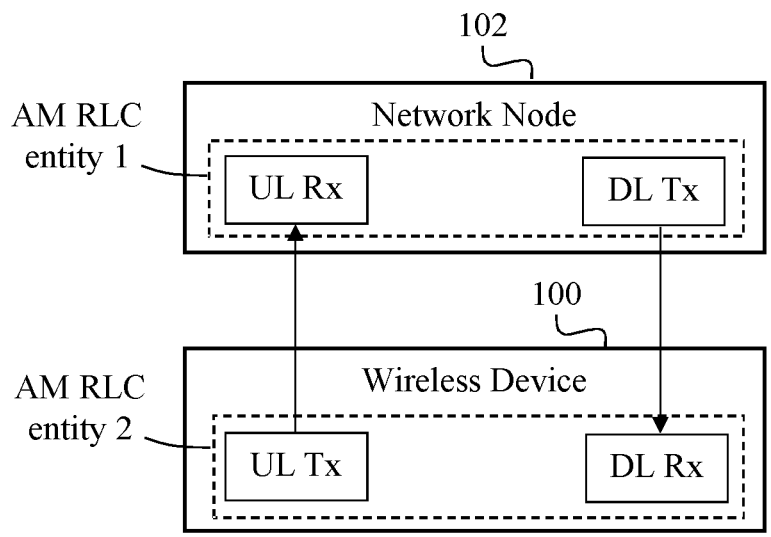
FIG. 2C illustrates how AM Radio Link Control RLC, entities can be arranged in the wireless device and the network node of FIGS. 2A and 2B.

A solution is provided in a wireless communication of data between a data sending node and a data receiving node, to ensure transmission of a status report from the data receiving node before a prescribed time limit, i.e. a deadline, "D" of the report expires, and at the same time reduce or even minimize the amount of radio resources required for getting the status report across to the data sending node in time. This can be accomplished by employing a first trigger and a second trigger for the status report such that the second trigger will basically be applied if the first one has not been applied, as follows. The status report thus indicates successful reception of data from the data sending node at the data receiving node.

Briefly described, the first trigger will be applied when there is data pending for transmission from the data receiving node which in that case transmits the status report together with the pending data to the data sending node. This way, the status report is "piggy-backed" on the data and needs not be transmitted alone which thereby saves radio resources since the data will be transmitted anyway, i.e. in a direction opposite to the data that is to be acknowledged by the report. The first trigger can thus be applied if there is pending data for the report to be piggy-backed on and delivered in time.

If the first trigger of pending data does not occur prior to a certain minimum duration "d-min" before the prescribed time limit, the second trigger will be applied to ensure that the status report is transmitted alone by the data receiving node in time before the prescribed time limit. For example, the second trigger can be realized by setting a scheduling priority of the status report so that transmission of the prioritized status report takes precedence over transmissions from any other nodes, if any, that may compete at least partly for the same radio resource(s). This may be realized in practice by setting the scheduling priority for a radio bearer on which the report will be transmitted. Hence, the first trigger is considered earlier in time than the second trigger and if the first trigger succeeds by piggy-backing the report on data that is transmitted anyway the second trigger is not necessary to apply, which will be explained in the following.

The solution will now be described in terms of functionality in a status manager which may be implemented either in the data receiving node or in the data sending node, e.g. depending on which one of the nodes is a network node which may further comprise a scheduler where the above-described second trigger is effectively applied. Throughout this disclosure, the term status manager could be replaced by "feedback manager" which indicates that it is operable to control status reporting, i.e. feedback, from the data receiving node to the data sending node, regarding reception of data. Furthermore, although the term PDU is frequently used herein as a representation of data, the solution and its embodiments are generally not limited by this terminology.

A non-limiting but illustrative example of how the solution may be employed in practice will now be described with reference to the signaling diagram in FIG. 3 which illustrates a status manager 300 that controls status reporting for a wireless communication of data between a data sending node 302 and a data receiving node 304. In line with the above-described definitions, the data which may be either uplink or downlink data is transmitted from the data sending node 302 towards the data receiving node 304, while a status report is to be transmitted from the data receiving node 304 to the data sending node 302 to acknowledge correctly received data.

The data sending node 302 may be a network node and the data receiving node 304 may be a wireless device, or vice versa. The status manager 300 is illustrated as a separate logic entity although it may be implemented in either of the data sending node 302 and the data receiving node 304 depending on which one of the nodes is a network node belonging to a wireless network. A scheduling function denoted "scheduler" 306 is also illustrated which basically allocates radio resources for wireless communications, including the one between nodes 302 and 304. The scheduler 306 is shown here as a separate logic entity although it is in practice typically implemented in the network node. It follows that the status manager 300 and the scheduler 306 can be implemented in the same node, i.e. a network node that could be either the data sending node 302 in the case of downlink data or the data receiving node 304 in the case of uplink data, as mentioned above.

A first action 3:1A illustrates that the data sending node 302 sends data in the form of a PDU towards the data receiving node 304 which then hopefully receives and decodes the data successfully, as shown in a next action 3:1B. This procedure may be repeated a number of times as implied by another PDU transmitted in action 3:2A which is hopefully received and decoded in action 3:2B.

At some point, the data sending node 302 needs to find out whether any of the transmitted PDUs has not been received and decoded successfully by the data receiving node 304 and thus needs retransmission. The data sending node 302 may therefore poll the data receiving node 304 by transmitting a poll for status to the data receiving node 304, in another action 3:4, which effectively means that data sending node 302 requests a status report from the data receiving node 304, e.g. in the form of a status PDU as shown in this example. Also other mechanisms for triggering a status report from the data receiving node 304 are possible, such as employing some predefined reporting scheme, known by the data receiving node 304, that triggers status reporting at prescribed intervals or certain conditions, without needing an explicit poll for each status report. The poll in action 3:4 is therefore illustrated here as a dashed and optional message which could be used or not, depending on implementation.

Another action 3:4A illustrates that the status manager 300 detects that the data receiving node 304 has been triggered to transmit a status report before a prescribed time limit "D" expires. If the data sending node 302 is a network node where the status manager 300 is implemented, the latter will know that a status report is triggered by transmission of the poll message from the network node in action 3:4. On the other hand, if the data receiving node 304 is a network node where the status manager 300 is implemented, the latter will know that a status report is triggered by reception of the poll message at the network node in action 3:4.

If no such poll is transmitted, another possibility to detect triggering of the status report is that the status manager 300 is aware of a predefined reporting scheme or the like. Yet another possibility if no poll is transmitted is that triggering of the status report may be detected by applying certain predefined rules for said triggering, particularly if the data receiving node 304 is a wireless device and the data sending node 302 is a network node where the status manager 300 is implemented which can thus use the same rules to determine that transmission of the status report has been triggered.

In either case, when detecting that a status report is required, the data receiving node 304 is triggered or instructed by the status manager 300 to wait for data pending for transmission in the opposite direction, i.e. some data to be transmitted from the data receiving node 304 towards the data sending node 302 as opposite to the data transmissions in actions 3:1A, 3:2A, etc. This is thus the above-mentioned "first trigger" which is released by the status manager 300 an action 3:5. In particular, the data receiving node 304 is thereby triggered to wait for pending data as long as the time left before said prescribed time limit D is greater than a minimum duration herein referred to as "d-min" for short. It should be noted that D represents a point in time, i.e. a deadline that is the maximum allowed "age" of the report before it must be transmitted, while d-min represents a certain duration or period of time before D.

Figure 3:
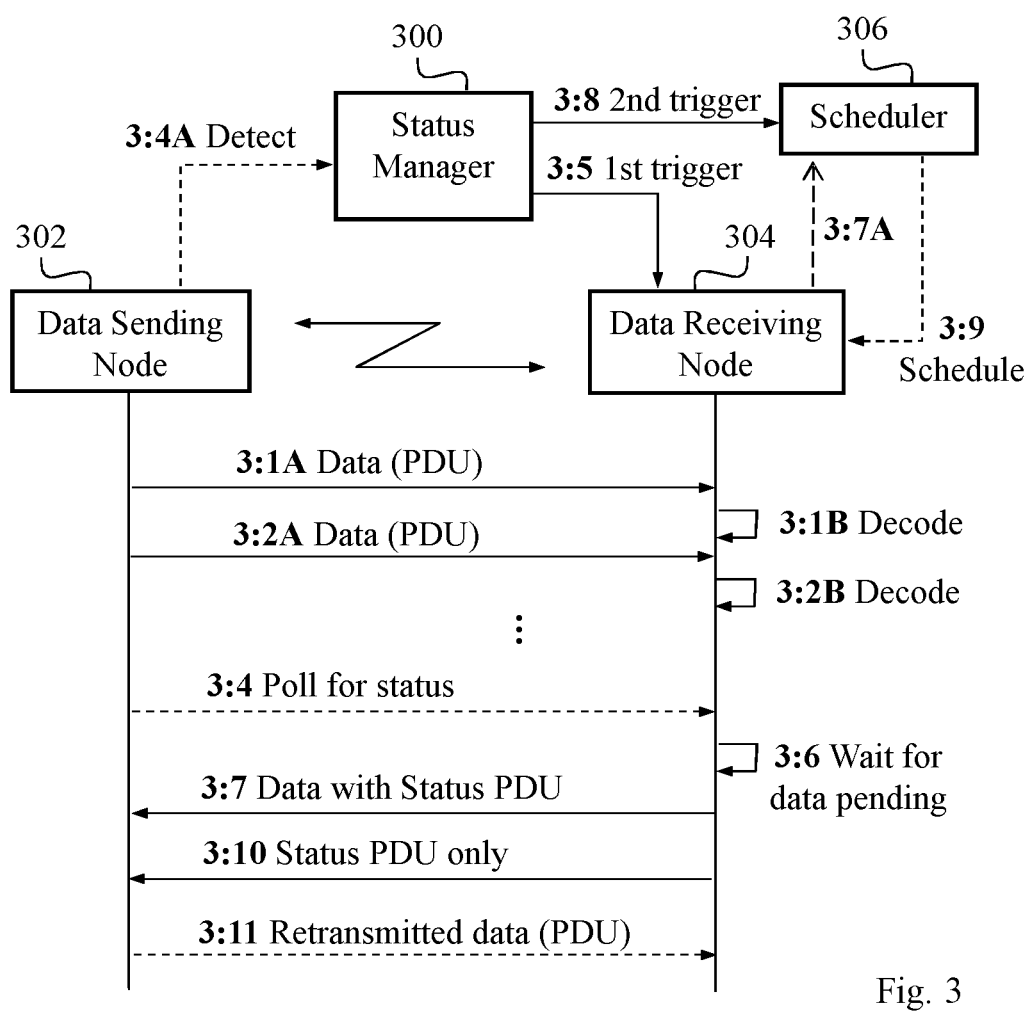
FIG. 3 is a signaling diagram illustrating an example of a procedure when the solution is used by means of a status manager, according to some example embodiments.
Figure 4:
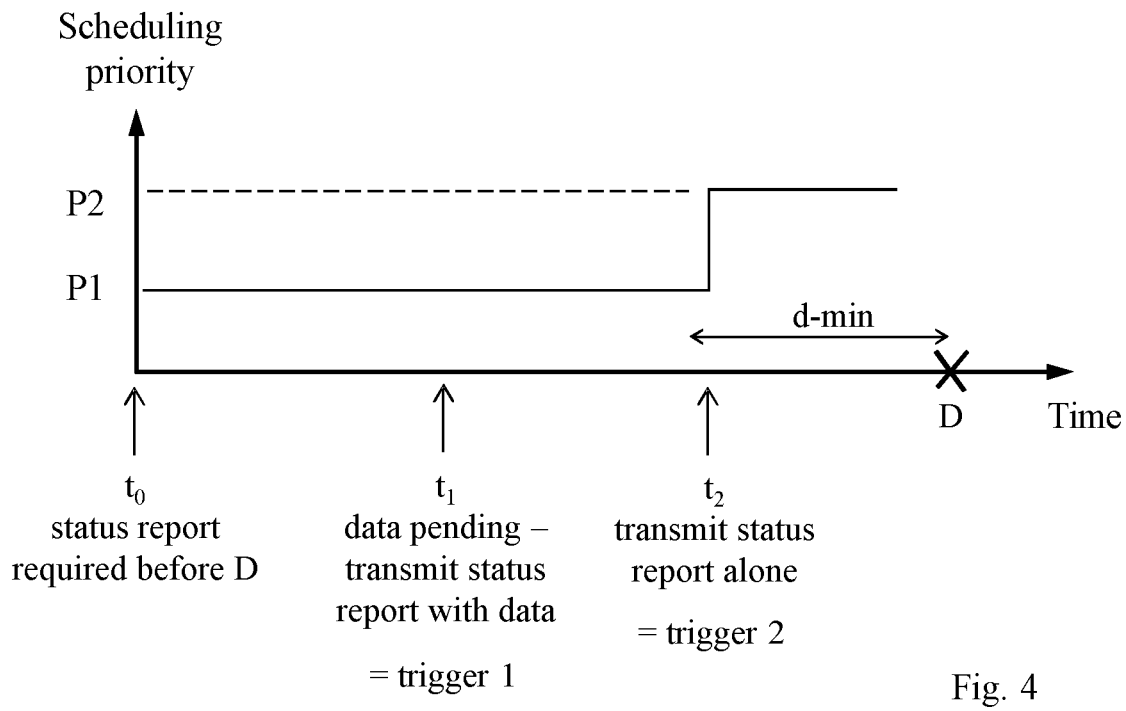
FIG. 4 is a time diagram illustrating how a first trigger and a second trigger may be applied to enable status reporting, according to further example embodiments.

The time diagram in FIG. 4 illustrates how the above time parameters D and d-min can be used to control a scheduling priority of the status report and this diagram will be referenced when further describing FIG. 3 as follows. At time $t_0$, it is detected that a status report is required from the data receiving node 304, as of actions 3:4, 3:4A. $t_0$ effectively determines when D will occur, i.e. depending on the largest allowed age of the report. The status report would initially have a scheduling priority P1 which is "normal" meaning that it is not higher than for any other transmissions that compete for the same radio resource(s) as the status report, such that radio resources will be assigned in turn for the transmissions when requested, basically in a "fair" manner.

In the example of FIG. 3 after action 3:6, one alternative is that the data receiving node 304 discovers that data is pending for transmission, which data may come from some application running in the data receiving node 304, in time before d-min is reached, i.e. before the time left until D has decreased to d-min. In this alternative, the first trigger is thus successful by occurring "in time" and the data receiving node 304 is able to transmit the status PDU together with the pending data to the data sending node 302 in an action 3:7, thereby saving radio resources by not sending the report alone which would otherwise require a separate transmission and added signaling as described above. The transmission of the report together with, i.e. piggy-backed on, the discovered pending data is illustrated at time $t_1$ in FIG. 4.

On the other hand, if no data is found pending for transmission from the data receiving node 304 to the data sending node 302 in time, i.e. when the time left before D becomes shorter than d-min, as another alternative after action 3:6, the first trigger is thereby unsuccessful by not occurring and the status manager 300 needs to release the second trigger instead as follows. The status manager 300 basically triggers transmission of the status report alone when discovering that no data has been found pending for transmission from the data receiving node 304 once d-min has been reached, which occurs at time $t_2$ in FIG. 4.

FIG. 4 also illustrates that transmission of the status report can be triggered by raising the scheduling priority of the status report to be higher than a scheduling priority of other transmissions that might compete for the same radio resource(s) as the data receiving node 304. The scheduling priority can be raised in this way from P1 to P2, by the status manager 300 instructing or triggering the scheduler 306 to do so once the time left before D becomes shorter than d-min, as indicated by an action 3:8. As a result, the scheduler 306 immediately schedules the necessary radio resources for the data receiving node 304 in action 3:9 so that it can transmit the report alone to the data sending node 302 in action 3:10 and at time $t_2$ in FIG. 4. A final shown optional action 3:11 illustrates that when having received the status report the data sending node 302 may retransmit some data (PDUs) that might be missing in the PDUs acknowledged by the status report.

By implementing the above-described first and second triggers, the status report will be transmitted together with data if possible, to save radio resources, or alone in case no pending data occurs in time, thereby ensuring that the report will reach the data sending node 302 in time so that any unnecessary retransmissions will be avoided of data that has been received and decoded successfully anyway.

It should be noted that FIG. 3 illustrates two different alternative procedures that may be conducted after action 3:6, namely action 3:7 if the first trigger is successful so that the second trigger is not used, or actions 3:8-3:10 if the first trigger is unsuccessful so that the second trigger must be used.

Figure 5:
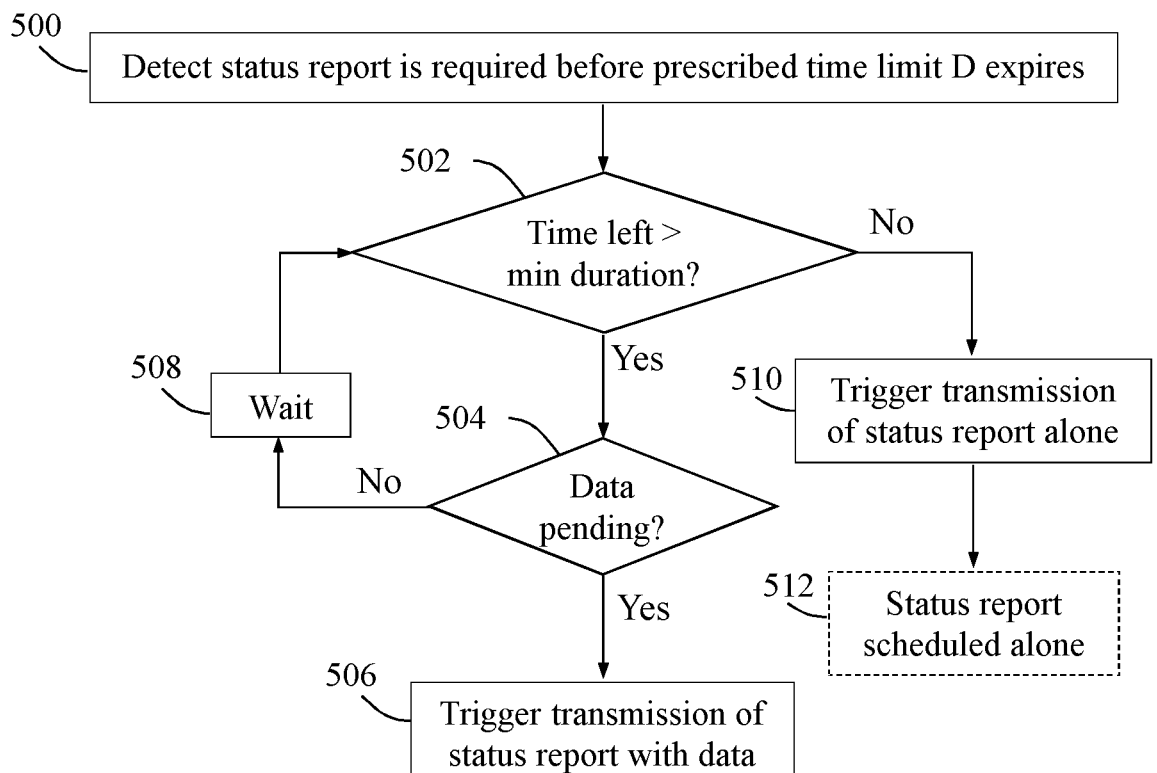
FIG. 5 is a flow chart illustrating a procedure that may be performed by a status manager, according to further example embodiments.

An example of how the solution may be employed in terms of actions performed by a status manager such as the status manager 300, is illustrated by the flow chart in FIG. 5 which will now be described with further reference to FIG. 3, although this procedure is not limited to the example of FIG. 3. FIG. 5 thus illustrates a procedure in a wireless communication of data between a data sending node 302 and a data receiving node 304, for controlling status reporting from the data receiving node 304 regarding reception of the data. This procedure may be performed in the above-described status manager 300. Some optional example embodiments that could be used in this procedure will also be described.

A first action 500 illustrates that it is detected that the data receiving node 304 has been triggered to transmit a status report that indicates received data to the data sending node 302 before a prescribed time limit D expires, as also shown in actions 3:4, 3:4A of FIG. 3. Some examples of how this can be detected have been described above for FIG. 3.

In another action 502, it is checked whether the time left before said prescribed time limit D is greater than a minimum duration d-min. If so (Yes in 502), the data receiving node 304 is triggered to transmit the status report together with data to the data sending node 302 if said data is pending for transmission from the data receiving node 304 when the time left before said prescribed time limit is greater than d-min. This can be done as follows.

In action 504, it is checked whether there is data pending in the data receiving node 304 after finding in action 502 that the time left before D is greater than d-min. If data is pending at this point (Yes in 504), the data receiving node 304 is triggered, in an action 506, to transmit the status report together with the pending data to the data sending node 302, as in action 3:7. If no data is found pending in action 504 (No in 504), the data receiving node 304 is instructed to wait in an action 508, corresponding to action 3:6, and thereafter return to action 502 to see if the time left before D is still greater than the minimum duration d-min or not. If so (Yes in 502), action 504 will be repeated to move the procedure to 506 or 508 as described above.

However, if it is found in action 502 that the time left before D is no longer greater than d-min (No in 502), another action 510 illustrates triggering transmission of the status report alone from the data receiving node 304, that is if no data was found pending for transmission from the data receiving node 304 before the time left before said prescribed time limit reaches the minimum duration. An action 512 illustrates that the status report is scheduled for transmission alone, e.g. by raising its priority in the scheduler 306, as also described for actions 3:8-3:10.

Some further examples of embodiments that may be employed in the above procedure in FIG. 3 will now be described. In one example embodiment, action 510 may be performed by instructing or triggering a scheduler 306 of the wireless communication to set a scheduling priority of the status report higher than a scheduling priority of other transmissions controlled by the scheduler. In that case, another example embodiment may be that said scheduling priority is set for a radio bearer on which the status report will be transmitted.

In further example embodiments, said data may comprise user plane payload or control information, or both. Some further example embodiments may be that said data is comprised in one or more Protocol Data Units, PDUs, and that the status report is a status PDU.

In another example embodiment, a state indicator may be maintained that indicates data and/or status report(s) pending for transmission on a radio bearer from the data receiving node 304 to the data sending node 302, as a basis for scheduling transmissions on said radio bearer. For example, the data receiving node 304 may have a number of status reports that are waiting for transmission where each status report has its own time limit D, so that the data receiving node 304 has a series of time limits before which the respective status reports need to be transmitted. The state indicator is thus useful to keep track of all the status reports that might be waiting and the state indicator may be employed as follows.

If the above state indicator is used, another example embodiment may be that the state indicator indicates a number of pending data bits or bytes, a number of pending status report bits or bytes, and an amount of time that has passed since the oldest pending status report was generated. This way, the status reports and any pending data can easily be controlled by appropriate scheduling to be transmitted in time, e.g. before the status reports' respective time limits D expire. In another example embodiment, the state indicator may indicate a total number of pending bits or bytes of data and status reports, and a variable which has a first value if there are only status report bits or bytes pending for transmission and a second value if there are both status report and data bits or bytes pending for transmission. The latter embodiment of the state indicator does not separately indicate how much data and how much status report there is to transmit, but it would require less memory space than the foregoing variant of the state indicator.

It was mentioned above that the solution may be used when the status manager 300 as well as the scheduler 306 are either implemented in the the data receiving node 304 or in the data sending node 302. In further example embodiments, the procedure of FIG. 5 may be performed in the data receiving node or in the data sending node, i.e. basically depending on where the above-described status manager 300 is implemented. Some possible variants of this are outlined below.

In another example embodiment, one of the data receiving node 304 and the data sending node 302 may be a network node comprising said scheduler 306 and the other node would then be a wireless device, and wherein the procedure of FIG. 5 is performed in said network node. In that case, another example embodiment may be that when the wireless device is the data receiving node and the network node is the data sending node, the network node performs said detecting that transmission of the status report has been triggered in the wireless device by applying predefined rules also applied by the wireless device to trigger the required status report. In that case, another example embodiment may be that triggering of the status report from the wireless device is detected in response to a poll sent from the data sending node 302 to the data receiving node 304, such as shown by action 3:4.

Figure 6:
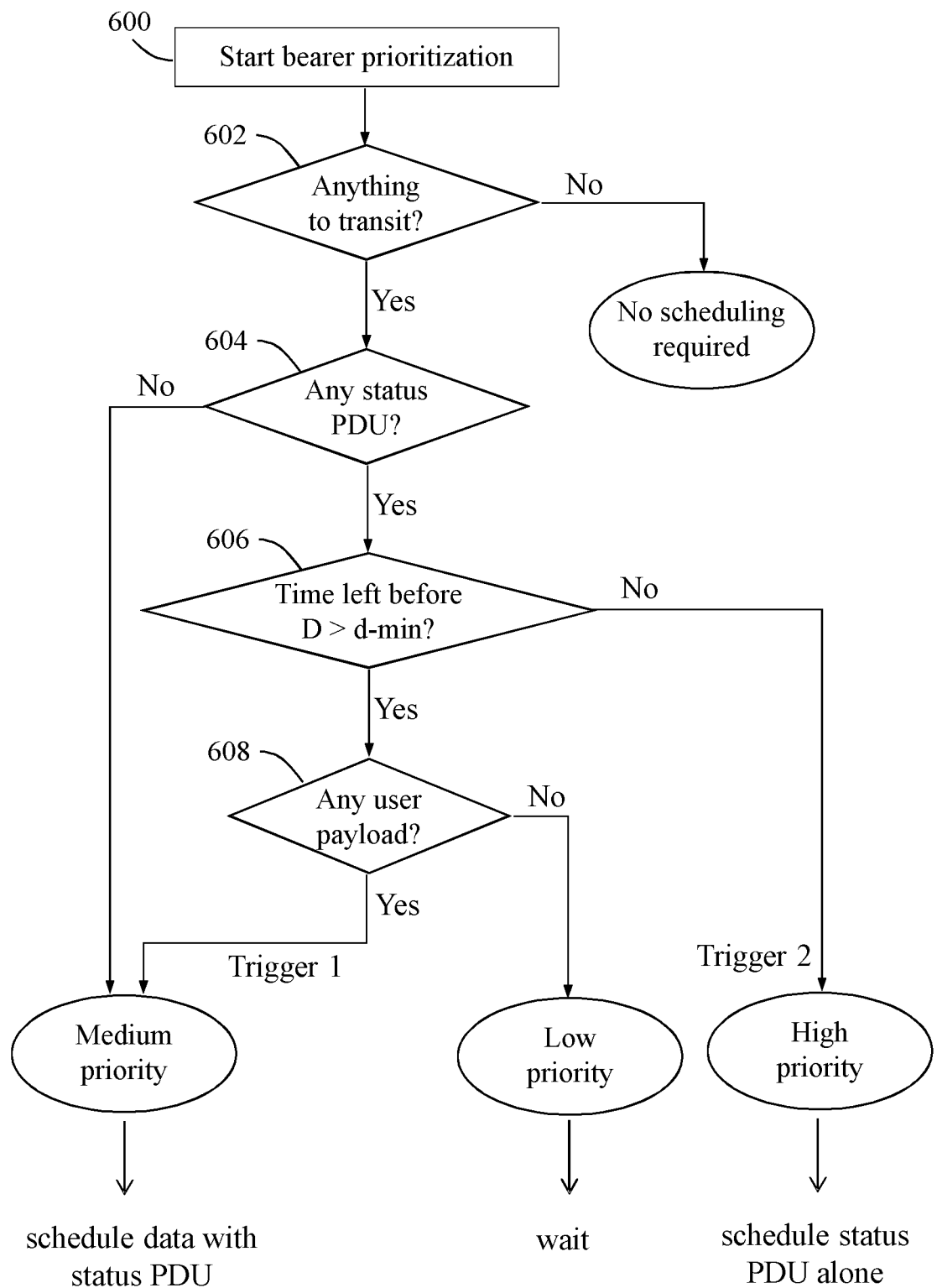
FIG. 6 is a flow chart illustrating a procedure for determining a scheduling priority for a radio bearer on which a status report is to be transmitted, according to further example embodiments.

An example of how a scheduling priority of a radio bearer for the status report can be controlled will now be described with reference to the flow chart in FIG. 6, which illustrates a priority scheme that may suitably be performed in a scheduler 306 where the status manager 300 is operable. The status report is referred to as a status PDU, and a time limit D and a minimum duration d-min are applicable for the status PDU in the manner described above. A first action 600 illustrates that bearer prioritization is started and it is then checked whether there is anything at all to transmit from the data receiving node 304, in another action 602. If not (No in 602), no scheduling is required and there is no radio bearer that needs prioritization.

If it is found in action 602 that there is something to transmit (Yes in 602), it is further checked in an action 604 whether there is any status PDU to be transmitted from the data receiving node 304. If not (No in 604), it means that there is only data to be transmitted and the radio bearer can be given a medium priority, P1 in FIG. 4, which means basically that the radio bearer needs to compete for radio resources that might be useful or requested for other transmissions also controlled by the scheduler 306 and which also may have a medium priority.

On the other hand, if it is found in action 604 that there is at least one status PDU to be transmitted (Yes in 604), it is further checked in an action 606 whether the time left before the report's time limit D expires is greater than the minimum duration d-min. If so (Yes in 606), it is further checked in an action 608 whether there is any user payload, i.e. data, that is pending for transmission from the data receiving node 304. If so, the above-described first trigger is released meaning that the data receiving node 304 is triggered to transmit the status PDU together with the user payload. In this case, the radio bearer can have the medium priority, P1 in FIG. 4, just as when there is only data to be transmitted (No in 604).

If it is found in action 608 that there is no user payload pending for transmission in the data receiving node 304, the radio bearer is given a low priority meaning basically that the status PDU will have to wait, just as in action 508, until there is user payload pending for transmission or until the time left before D reaches d-min, whichever comes first. This means basically that actions 606 and 608 are checked more or less continuously.

However, once it is found in action 606 that the time that is currently left before D has reached d-min (No in 606), it means that the first trigger has not been successful and the above-described second trigger is released and the status PDU is given a high (raised) priority, P2 in FIG. 4, so that the status PDU is immediately scheduled for transmission alone from the data receiving node 304.

Figure 7:
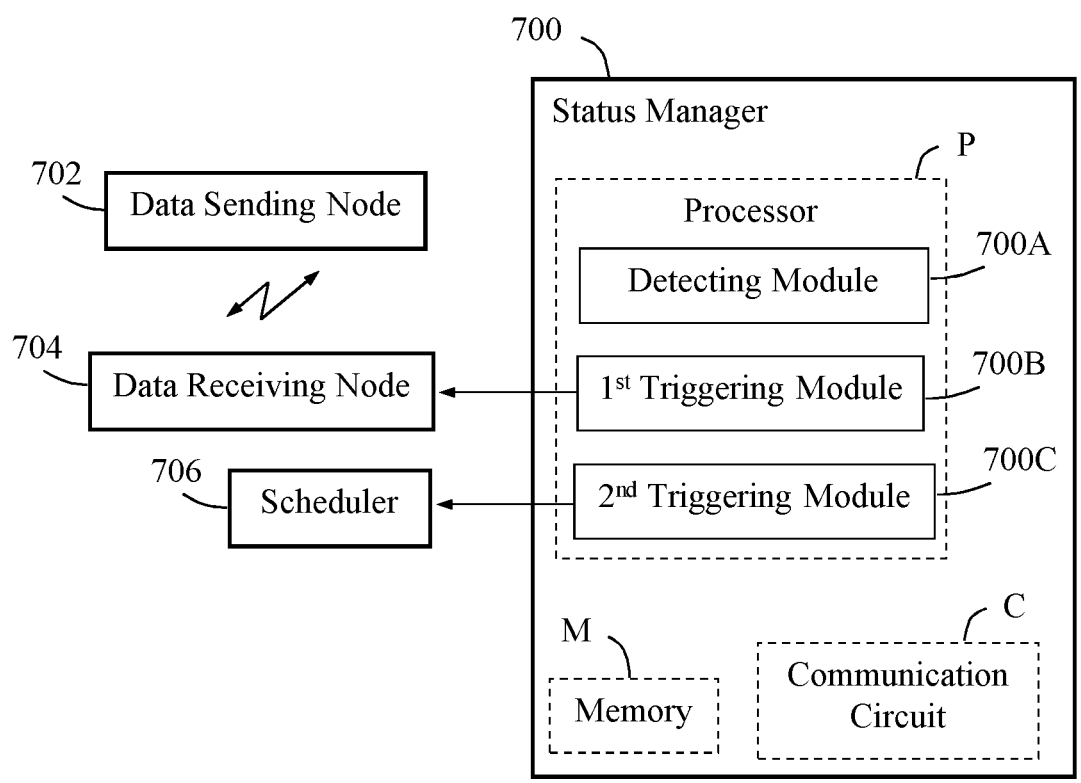
FIG. 7 is a block diagram illustrating how a status manager may be structured, according to further example embodiments.

The block diagram in FIG. 7 illustrates a detailed but non-limiting example of how a status manager 700 may be structured to bring about the above-described solution and embodiments thereof. In this figure, the status manager 700 may be configured to operate according to any of the examples and embodiments of employing the solution as described herein, where appropriate. The status manager 700 is shown to comprise a processor "P", a memory "M" and a communication circuit "C" with suitable equipment for transmitting and receiving information and messages in the manner described herein.

The communication circuit C in the status manager 700 thus comprises equipment configured for communication using a suitable protocol for the communication depending on the implementation. The solution is however not limited to any specific types of messages or protocols.

The status manager 700 is, e.g. by means of units, modules or the like, configured or arranged to perform at least some of the actions of the flow charts in FIGS. 5 and 6 and as follows.

The status manager 700 is arranged to control status reporting from a data receiving node 704 regarding reception of data in a wireless communication of data between a data sending node 702 and the data receiving node 704. In this figure, the status manager 700 corresponds to the status manager 300 in FIG. 3, the data sending node 702 corresponds to the data sending node 302 in FIG. 3, and the data receiving node 704 corresponds to the data receiving node 304 in FIG. 3. A scheduler 706 is also illustrated which allocates radio resources for wireless communications, including the one between nodes 702 and 704. The scheduler 706 corresponds to the scheduler 306 in FIG. 3. These entities are basically at least partly operable in the manner described above for FIGS. 3-6.

The status manager 700 is configured to detect that the data receiving node has been triggered to transmit a status report that indicates received data to the data sending node before a prescribed time limit D expires. This operation may be performed by a detecting module 700A in the status manager 700, as also illustrated in action 500. The detecting module 700A could alternatively be named a discovering module or noticing module.

The status manager 700 is also configured to trigger the data receiving node 704 to transmit the status report together with data to the data sending node 702 if said data is pending for transmission from the data receiving node when the time left before said prescribed time limit is greater than a minimum duration d-min. This operation may be performed by a first triggering module 700B in the status manager 700, as also illustrated in action 506. The first triggering module 700B could alternatively be named a first instructing module.

The status manager 700 is further configured to trigger transmission of the status report alone if no data is pending for transmission from the data receiving node when the time left before said prescribed time limit becomes shorter than the minimum duration. This operation may be performed by a second triggering module 700C in the status manager 700, as also illustrated in action 510. The second triggering module 700C could alternatively be named a second instructing module.

The status manager 700 may be further configured to trigger transmission of the status report alone by instructing or triggering a scheduler 706 of the wireless communication to set a scheduling priority of the status report higher than a scheduling priority of other transmissions controlled by the scheduler 706.

It should be noted that FIG. 7 illustrates various functional modules in the status manager 700 and the skilled person is able to implement these functional modules in practice using suitable software and hardware equipment. Thus, the solution is generally not limited to the shown structure of the status manager 700, and the functional modules therein may be configured to operate according to any of the features, examples and embodiments described in this disclosure, where appropriate.

The functional modules 700A-C described above may be implemented in the status manager 700 by means of program modules of a computer program comprising code means which, when run by the processor P causes the status manager 700 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

The computer program may be carried by a computer program product in the status manager 700 in the form of a memory having a computer readable medium and being connected to the processor P. The computer program product or memory M in the status manager 700 thus comprises a computer readable medium on which the computer program is stored e.g. in the form of computer program modules or the like. For example, the memory M may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the status manager 700.

The solution described herein may be implemented in the status manager 700 by a computer program comprising instructions which, when executed on at least one processor, cause the at least one processor to carry out the actions according to any of the above embodiments and examples, where appropriate. The solution may also be implemented at the status manager 700 in a carrier containing the above computer program, wherein the carrier is one of an electronic signal, optical signal, radio signal, or computer readable storage medium.

While the solution has been described with reference to specific exemplifying embodiments, the description is generally only intended to illustrate the inventive concept and should not be taken as limiting the scope of the solution. For example, the terms "status manager", "data sending node", "data receiving node", "data", "status report", "prescribed time limit", "Protocol Data Unit, PDU", "scheduling priority" and "state indicator" have been used in this disclosure, although any other corresponding entities, functions, and/or parameters could also be used having the features and characteristics described here. The solution is defined by the appended claims.

The invention claimed is:

1. A method for controlling status reporting in a wireless data communication between a data sending node and a data receiving node, the method comprising:
   detecting that the data receiving node has been triggered to transmit a status report that indicates received data to the data sending node before a prescribed time limit expires;
   determining whether a time left before the prescribed time limit is greater than a minimum duration;
   in response to determining that the time left before the prescribed time limit is greater than the minimum duration, determining whether data is pending in the data receiving node;
   in response to determining that the data is pending in the data receiving node, triggering the data receiving node to transmit the status report together with the pending data to the data sending node; and
   in response to determining that the time left before the prescribed time limit is not greater than the minimum duration, triggering the data receiving node to transmit the status report alone to the data sending node.

2. The method according to claim 1 further comprising instructing/triggering a scheduler to set a scheduling priority of the status report higher than a scheduling priority of other transmissions controlled by the scheduler.

3. The method according to claim 2, wherein the scheduling priority is set for a radio bearer on which the status report will be transmitted.

4. The method according to claim 2, wherein one of the data receiving node and the data sending node is a network node comprising the scheduler, wherein the other of the data receiving node and the data sending node is a wireless device, and wherein the method is performed in the network node.

5. The method according to claim 4, wherein the data receiving node is the wireless device, wherein the data sending node is the network node, and wherein the network node performs said detecting that transmission of the status report has been triggered in the wireless device by applying predefined rules also applied by the wireless device to trigger the required status report.

6. The method according to claim 5, wherein triggering of the status report from the wireless device is detected in response to a poll sent from the data sending node to the data receiving node.

7. The method according to claim 1 further comprising maintaining a state indicator that indicates data and/or status report(s) pending for transmission on a radio bearer from the data receiving node to the data sending node, as a basis for scheduling transmissions on the radio bearer.

8. The method according to claim 7, wherein the state indicator indicates a number of pending data bits or bytes, a number of pending status report bits or bytes, and an amount of time that has passed since the oldest pending status report was generated.

9. The method according to claim 7, wherein the state indicator indicates a total number of pending bits or bytes of data and status reports, and a variable which has a first value if there are only status report bits or bytes pending for transmission and a second value if there are both status report and data bits or bytes pending for transmission.

10. The method according to claim 1, wherein the method is performed in the data receiving node or in the data sending node.

11. A computer program product comprising a non-transitory computer readable storage medium comprising instructions which, when executed on at least one processor, cause the at least one processor to carry out the method according to claim 1.

12. A status manager for controlling status reporting in a wireless data communication between a data sending node and a data receiving node, the status manager being configured to perform operations comprising:
   detecting that the data receiving node has been triggered to transmit a status report that indicates received data to the data sending node before a prescribed time limit expires;
   determining whether a time left before the prescribed time limit is greater than a minimum duration;
   in response to determining that the time left before the prescribed time limit is greater than the minimum duration, determining whether data is pending in the data receiving node;
   in response to determining that the data is pending in the data receiving node, triggering the data receiving node to transmit the status report together with the pending data to the data sending node; and
   in response to determining that the time left before the prescribed time limit is not greater than the minimum duration, triggering the data receiving node to transmit the status report alone to the data sending node.

13. The status manager according to claim 12, wherein the operations further comprise instructing or triggering a scheduler to set a scheduling priority of the status report higher than a scheduling priority of other transmissions controlled by the scheduler.

14. The status manager according to claim 13, wherein the scheduling priority is set for a radio bearer on which the status report will be transmitted.

15. The status manager according to claim 13, wherein one of the data receiving node and the data sending node is a network node comprising the scheduler, wherein the other of the data receiving node and the data sending node is a wireless device, and wherein the status manager is implemented in the network node.

16. The status manager according to claim 15, wherein the data receiving node and is the wireless device, wherein the data sending node is the network node, and wherein the network node performs said detecting that transmission of the status report has been triggered in the wireless device by applying predefined rules also applied by the wireless device to trigger the required status report.

17. The status manager according to claim 16, wherein triggering of the status report from the wireless device is detected in response to a poll sent from the data sending node to the data receiving node.

18. The status manager according to claim 12, wherein the operations further comprise maintaining a state indicator that indicates data and/or status report(s) pending for transmission on a radio bearer from the data receiving node to the data sending node, as a basis for scheduling transmissions on said radio bearer.

19. The status manager according to claim 18, wherein the state indicator indicates a number of pending data bits or bytes, a number of pending status report bits or bytes, and an amount of time that has passed since the oldest pending status report was generated.

20. The status manager according to claim 18, wherein the state indicator indicates a total number of pending bits or bytes of data and status reports, and a variable which has a first value if there are only status report bits or bytes pending for transmission and a second value if there are both status report and data bits or bytes pending for transmission.

* * * * *